「(12) United States Patent
Myers et al.

(10) Patent No.: US 10,499,669 B2
(45) Date of Patent: *Dec. 10, 2019

(54) NATURAL BLUE-SHADE COLORANTS AND METHODS OF MAKING AND USING SAME

(71) Applicant: Sensient Colors LLC, St. Louis, MO (US)

(72) Inventors: Gale D. Myers, St. Louis, MO (US); Michael C. Jelavich, St. Louis, MO (US); Leo H. Otto, St. Louis, MO (US); Jeffrey R. Plodzien, Florissant, MO (US)

(73) Assignee: Sensient Colors LLC, St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/377,713

(22) Filed: Dec. 13, 2016

(65) Prior Publication Data

US 2017/0086486 A1 Mar. 30, 2017

Related U.S. Application Data

(63) Continuation of application No. 12/927,844, filed on Nov. 24, 2010, now Pat. No. 9,534,117.

(60) Provisional application No. 61/283,028, filed on Nov. 25, 2009, provisional application No. 61/293,488, filed on Jan. 8, 2010.

(51) Int. Cl.
  A23L 5/43 (2016.01)
  C09B 61/00 (2006.01)
(52) U.S. Cl.
  CPC ............ A23L 5/43 (2016.08); C09B 61/00 (2013.01)
(58) Field of Classification Search
  CPC .... C09B 61/00; A23V 2250/2104; A23L 5/43
  See application file for complete search history.

(56) References Cited

U.S. PATENT DOCUMENTS 3,787,591 A    1/1974  Hagiwara
2003/0082281 A1  5/2003  Kohler et al.
2004/0022904 A1  2/2004  Nguyen
2006/0003060 A1  1/2006  Lauro
2008/0160084 A1  7/2008  Huynh et al.

FOREIGN PATENT DOCUMENTS

JP    2001329186    11/2001

OTHER PUBLICATIONS

Hillebrand, S., Naumann, H., Kitzinski, N., Kohler, N., Winterhalter, P. 2009. Isolation and Characterization of Anthocyanins from Blue-fleshed Potatoes (*Solanum tuberosum* L.). Food 3 (Special Issue 1). pp. 96-101.
Segur, J.B., Oberstar, H.E. 1951. "Viscosity of Glycerol and Its Aqueous Solutions." Industrial and Engineering Chemistry. vol. 43. pp. 2117-2120.
Shibata, K., Shibata, Y., Kasiwagi, I. 1919. "Studies on Anthocyanins: Color Variation in Anthocyanins." J. Am. Chem. Soc. vol. 41. pp. 208-220.
International Search Report and Written Opinion for Application No. PCT/US2010/003054 dated Mar. 31, 20114(11 pages).
Database WPI Week 200227 Thomson Scientific, London, GB; AN 2002-210972; XP002628156 abstract organic chemistry part.
International Preliminary Report on Patentability for Application No. PCT/US2010/003054 dated Jun. 7, 2012 (8 pages).
Canadian Patent Office Action for Application No. 2,781,256 dated Jun. 27, 2016 (3 pages).

*Primary Examiner* — Nikki H. Dees
(74) *Attorney, Agent, or Firm* — Michael Best & Friedrich LLP

(57) ABSTRACT

Composition having a blue color including a buffer, an anthocyanin, and a divalent ion source. The composition may comprise an anthocyanin and a divalent ion source, wherein the average variation of $\Delta E^*_{ab}$ of the composition is less than 30% of the average variation of $\Delta E^*_{ab}$ of a control composition after exposure of the composition and the control composition to a 400 to 765 W/m² light source for a period of time. The composition may comprise an anthocyanin and a divalent ion source, wherein the composition exhibits a less than 20% change in the area beneath the reflectance colorimeter spectral curve of the composition from 430 nm to 530 nm measured over a period of time. In another aspect, a method of stabilizing a blue colorant is provided. The method may comprise combining a buffer, an anthocyanin, and a divalent ion source.

20 Claims, 10 Drawing Sheets
(4 of 10 Drawing Sheet(s) Filed in Color)

NATURAL BLUE-SHADE COLORANTS AND METHODS OF MAKING AND USING SAME

CROSS-REFERENCE TO RELATED APPLICATIONS

This application is a continuation of U.S. patent application Ser. No. 12/927,844, filed on Nov. 24, 2010, which claims priority under 35 U.S.C. § 119(e) to U.S. Provisional Patent Application No. 61/283,028, filed Nov. 25, 2019 and to U.S. Provisional Patent Application No. 61/293,488, filed on Jan. 8, 2010. The contents of these applications are hereby incorporated by reference in their entirety.

BACKGROUND

Color is an important aspect of many products, and in particular, food products. Because color can significantly influence food product appearance and thus its appeal to potential consumers, food colorants that remain true over time are desirable. In the case of conventional blue compositions used for food colorant, once the colorant turns blue and is integrated into a food product, it may not be stable. Due to this instability, the colorant may either revert back to a purple/violet shade or fade to colorless fairly quickly, which can result in a product with less than optimal visual and aesthetic appeal.

SUMMARY

Among other things a composition having a blue color is provided. The composition may comprise a buffer, an anthocyanin, and a divalent ion source.

In another aspect, a composition having a blue color is provided. The composition may comprise an anthocyanin and a divalent ion source, wherein the average variation of $\Delta E^*_{ab}$ of the composition is less than 30% of the average variation of $\Delta E^*_{ab}$ of a control composition after exposure of the composition and the control composition to a 400 to 765 W/m² light source for a period of time. The period of time may be at least 13 weeks. The control composition may comprise the same components as the composition in the same amounts but comprises no divalent ion source.

In another aspect, a composition having a blue color is provided. The composition may comprise an anthocyanin and a divalent ion source, wherein the composition exhibits a less than 20% change in the area beneath the reflectance colorimeter spectral curve of the composition from 430 nm to 530 nm measured over a period of time, wherein the period of time is at least 13 weeks.

In another aspect, a method of stabilizing a blue colorant is provided. The method may comprise combining a buffer, an anthocyanin, and a divalent ion source.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
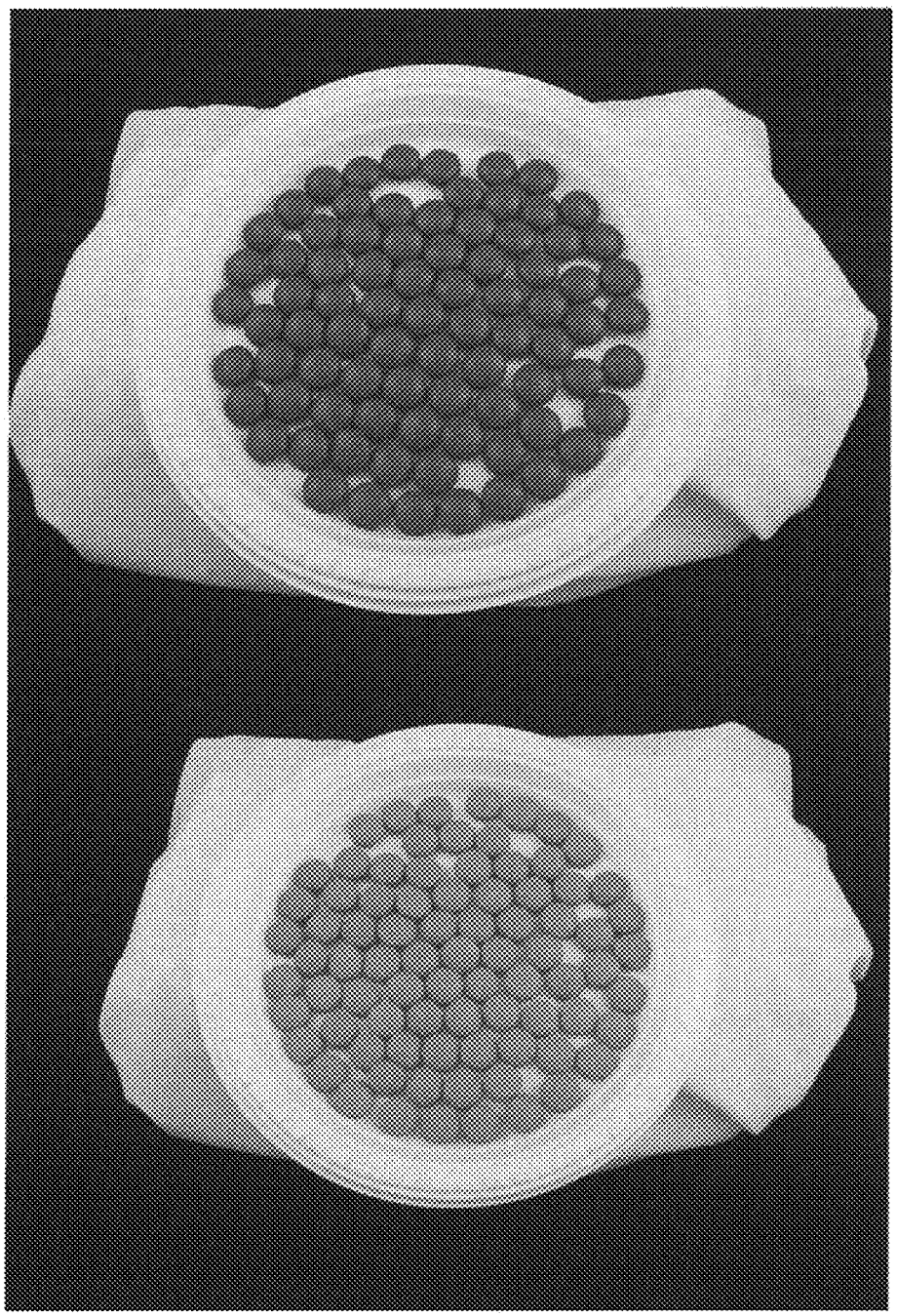
FIG. 1 shows TOP) a blue panned product and BOTTOM) a green panned product.

The present disclosure is not limited in its disclosure to the specific details of construction, arrangement of components, or method steps set forth herein. The compositions and methods disclosed herein are capable of being made, practiced, used, carried out and/or formed in various ways. The phraseology and terminology used herein is for the purpose of description only and should not be regarded as limiting. Ordinal indicators, such as first, second, and third, as used in the description and the claims to refer to various structures or method steps, are not meant to be construed to indicate any specific structures or steps, or any particular order or configuration to such structures or steps. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification, and no structures shown in the drawings, should be construed as indicating that any non-claimed element is essential to the practice of the invention. The use herein of the terms "including," "comprising," or "having," and variations thereof, is meant to encompass the items listed thereafter and equivalents thereof, as well as additional items. Unless specified or limited otherwise, the terms "mounted," "connected," "supported," and "coupled" and variations thereof encompass both direct and indirect mountings, connections, supports, and couplings. Further, "connected" and "coupled" are not restricted to physical or mechanical connections or couplings.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure. Use of the word "about" to describe a particular recited amount or range of amounts is meant to indicate that values very near to the recited amount are included in that amount, such as values that could or naturally would be accounted for due to manufacturing tolerances, instrument and human error in forming measurements, and the like.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinency of any of the documents cited herein. All references cited herein are fully incorporated by reference, unless explicitly indicated otherwise. The present disclosure shall control in the event there are any disparities.

The present disclosure may provide a composition comprising 1) at least one of a divalent cation and a pH buffer; and 2) an anthocyanin. In some embodiments, the composition comprises a divalent cation, a pH buffer and an anthocyanin. The disclosure may also provide methods for making and using the composition. In one embodiment, a method comprises combining a pH buffer with a divalent cation source in the presence of an anthocyanin to form a natural blue-shade colorant. The resulting colorant may be stabilized for many food applications. Anthocyanins typically have a natural violet shade. Without the synergy among the components forming the colorant, the blue shade may fade and/or the natural violet shade of the anthocyanin may return in a short period of time.

There currently is no natural green or blue colorant approved for use in foods in the United States. The stabilized, natural blue-shade colorants of the present disclosure can be provided to various food market segments, so that they may in turn offer their consumers naturally-colored products in a wide array of shades. Not only can blue shades be achieved, but, in combination with other natural yellow colorants, natural green shades can also be obtained.

Embodiments of the present disclosure disclose a natural blue-shade colorant that is unique in the combination of components, the synergy they provide in the system, and the stability of shade offered in the finished food product. In some embodiments, the natural colorant may be used in a confectionery market segment, for example, on panned candies.

As used herein, the terms "natural colorant" and "natural coloring agent" refer to a color additive exempt from certification for use in food intended for human consumption, as defined in the Code of Federal Regulations—Title 21, Part 73 and/or to a color additive acceptable for use in food intended for animal consumption, as defined in the 2010 Official Publication of the Association of American Feed Control Officials. For example, a "natural anthocyanin" refers to an anthocyanin exempt from certification for use in food intended for human consumption, as defined in the Code of Federal Regulations—Title 21, Part 73 and/or to an anthocyanin acceptable for use in food intended for animal consumption, as defined in the 2010 Official Publication of the Association of American Feed Control Officials.

Anthocyanin

In one aspect, the present disclosure provides a natural blue-shade colorant including an anthocyanin of the formula:

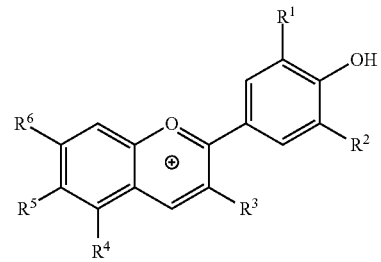

wherein $R^1$, $R^2$, and $R^5$ are each independently H, OH, or $OCH_3$, and $R^3$, $R^4$, and $R^6$ are each independently H, OH, $OCH_3$, a sugar residue, or an acylated sugar residue. The anthocyanin may be a synthetic or a natural anthocyanin. In some embodiments, the anthocyanin may be an anthocyanin exempt from certification for use in food intended for human consumption, as defined in the Code of Federal Regulations—Title 21, Part 73. In some embodiments, the anthocyanin may be acceptable for use in food intended for animal consumption, as defined in the 2010 Official Publication of the Association of American Feed Control Officials.

Examples of natural anthocyanin sources may include, but are not limited to, *Vaccinium* species, including without limitation, blueberry, cranberry and bilberry; Rubus berries, including without limitation, black raspberry, red raspberry and blackberry; black currant; cherry; eggplant peel; black rice; Concord grape and muscadine grape; red cabbage; violet petals; banana; asparagus; pea; fennel; pear; potato; yam; sweet potato; seed coat of black soybean; black chokeberry; the Amazonian palmberry (açai), and combinations thereof. In some embodiments, the anthocyanin source may be red cabbage. The anthocyanin may be approved for food use in foods intended for human consumption and/or for animal consumption.

Typically, the anthocyanin colorant pH is at least about 5, at least about 5.1, at least about 5.2, at least about 5.3, at least about 5.4, at least about 5.5, at least about 5.6, at least about 5.7, at least about 5.8, at least about 5.9, at least about 6, at least about 6.1, at least about 6.2, at least about 6.3, at least about 6.4, at least about 6.5, at least about 6.6, at least about 6.7, at least about 6.8, at least about 6.9, or at least about 7.0. The pH may be less than about 10, less than about 9.9, less than about 9.8, less than about 9.7, less than about 9.6, less than about 9.5, less than about 9.4, less than about 9.3, less than about 9.2, less than about 9.1, less than about 9, less than about 8.9, less than about 8.8, less than about 8.7, less than about 8.6, less than about 8.5, less than about 8.4, less than about 8.3, or less than about 8.2. This includes ranges between about 5 and about 10, about 6 and 9, or between about 7 and about 8.2.

Buffer

Natural blue-shade colorant compositions of the present disclosure can include a buffer. The buffer may raise the pH of the colorant in order to achieve a consistent blue shade from the anthocyanin. Suitable buffers may include, but are not limited to, tetrasodium pyrophosphate ("TSPP"), sodium carbonate, sodium bicarbonate, calcium carbonate, sodium tripolyphosphate, sodium acid phosphate, calcium diacetate, calcium hexametaphosphate, monobasic calcium phosphate, dipotassium phosphate, disodium phosphate, sodium gluconate, sodium hexametaphosphate, sodium metaphosphate, sodium phosphate, sodium pyrophosphate, and combinations thereof. In some embodiments, the buffer may include TSPP. The buffer may be approved for food use in foods intended for human consumption and/or for animal consumption.

Divalent Ion Source

Natural blue-shade colorant compositions of the present disclosure can include a divalent cation source. In some embodiments, the divalent cation may comprise, for example, Ca+2 ion, Mg+2 ion, Fe+2 ion, Zn+2 or combinations thereof. The calcium ion may be from a suitable calcium ion source known in the art, including without limitation, calcium carbonate, calcium chloride, calcium phosphate (mono-, di-, and tribasic), calcium silicate, hydrated sodium calcium aluminosilicate, tricalcium silicate, calcium ascorbate, calcium sorbate, calcium diacetate, calcium hexametaphosphate, calcium pyrophosphate, and combinations thereof. The magnesium ion may be from a suitable magnesium ion source known in the art, including without limitation, magnesium silicate, magnesium carbonate, magnesium citrate, magnesium stearate, magnesium chloride, and combinations thereof. The iron ion may be from a suitable iron ion source known in the art, including, without limitation, iron oxide. The zinc ion may be from a suitable ion source known in the art, including, without limitation zinc sulfate, zinc stearate, zinc oxide, zinc chloride, zinc gluconate, and combinations thereof. In some embodiments, the calcium ion source may include calcium carbonate. The divalent ion source may be approved for food use in foods intended for human consumption and/or for animal consumption.

Composition Having a Blue Color

Colorant compositions according to the present disclosure may comprise various combinations of a buffer, a divalent ion source, and an anthocyanin. For example, the composition may comprise at least about 0.1% by weight, at least about 0.5% by weight, at least about 1% by weight, at least about 5% by weight, at least about 10% by weight buffer, at least about 15% by weight, and at least about 20% by weight buffer. The composition may comprise less than about 50% by weight, less than about 45% by weight, less than about 40% by weight, less than about 35% by weight, less than about 30% by weight, less than about 25% by weight, less than about 20% by weight, less than about 15% by weight, and less than about 10% by weight of buffer. In some embodiments, the composition may comprise about 0.1% by weight to about 50% by weight, about 0.5% by weight to about 45% by weight, about 1% by weight to about 40% by weight, about 5% by weight to about 35% by weight of buffer, or about 10% by weight to about 3% by weight of buffer.

In some embodiments, the composition may comprise at least about 1% by weight, at least about 2% by weight, at least about 4% by weight, at least about 6% by weight, at least about 8% by weight, at least about 10% by weight, at least about 12% by weight, and at least about 15% by weight divalent ion source. The composition may comprise less than about 50% by weight, less than about 45% by weight, less than about 40% by weight, less than about 35% by weight, less than about 30% by weight, or less than about 25% by weight of divalent ion source. In some embodiments, the composition may comprise about 1% by weight to about 50% by weight, about 4% by weight to about 40% by weight, about 10% by weight to about 30% by weight, or about 15% by weight to about 25% by weight of a divalent ion source.

In some embodiments, the composition may comprise at least about 2.5% by weight, at least about 5% by weight, at least about 7.5% by weight, at least about 10% by weight, at least about 15% by weight, at least about 20% by weight, at least about 25% by weight, at least about 30% by weight, at least about 35% by weight, and at least about 40% by weight anthocyanin. The composition may comprise less than about 85% by weight, less than about 80% by weight, less than about 75% by weight, less than about 70% by weight, less than about 65% by weight, less than about 60% by weight, less than about 55% by weight, less than about 50% by weight, less than about 45% by weight, less than about 40% by weight, less than about 35% by weight, and less than about 30% by weight of anthocyanin. In some embodiments, the composition may comprise about 2.5% by weight to about 85% by weight, about 5% by weight to about 80% by weight, about 7.5% by weight to about 75% about 10% by weight to about 70% by weight, about 15% by weight to about 65% by weight, about 20% by weight to about 60% by weight, or about 25% by weight to about 55% by weight of anthocyanin. Different ratios of components may yield a specific pH and thereby a specific shade of color (from purple to blue) that remains stable in or on a food product.

Compositions according to the present disclosure may comprise other components, such as, for example, an additional coloring agent. In some embodiments, the composition can include a plurality of additional coloring agents. The additional coloring agent can be, for example, a powder, paste, granule, or solution. The additional coloring agent can be a synthetic coloring agent or a natural coloring agent. A synthetic coloring agent may be, for example, a synthetic pigment or dye approved by the Food and Drug Administration for the use in foods, drugs, and cosmetics, such as, for example, FD&C Blue No. 1, FD&C Blue No. 2, FD&C Green No. 3, FD&C Red No. 40, FD&C Red No. 3, FD&C Yellow No. 5, FD&C Yellow No. 6, and combinations thereof. A natural coloring agent can be, including without limitation, annatto, turmeric, cochineal, carmine, paprika, beta carotenes, carotenoids, gardenia, iron oxides, marigold extract, lutein, chlorophyll, titanium dioxide, carbon black (e.g., vegetable carbon black), betanin, saffron, safflower, caramel, lycopene, monascus, red cabbage, radish, and combinations thereof. In some embodiments, the composition may comprise at least about 0.1% by weight, at least about 1% by weight, at least about 2% by weight, at least about 5% by weight, at least about 10% by weight, at least about 15% by weight, at least about 20% by weight, at least about 25% by weight, at least about 30% by weight, at least about 35% by weight, at least about 40% by weight, at least about 45% by weight, and at least about 50% by weight of an additional coloring agent. The composition may comprise less than about 99% by weight, less than about 95% by weight, less than about 90% by weight, less than about 85% by weight, less than about 80% by weight, less than about 75% by weight, less than about 70% by weight, less than about 65% by weight, less than about 60% by weight, less than about 55% by weight, and less than about 50% by weight of an additional coloring agent. In some embodiments, the composition may comprise about 0.1% by weight to about 99% by weight, about 10% by weight to about 90% by weight, or about 20% by weight to about 80% by weight of an additional coloring agent. In some embodiments, the additional coloring agent may be a natural coloring agent.

In some embodiments, colorants according to the present disclosure may include components, such as, for example, polyvinylpyrrolidone ("PVP") and gum arabic.

Because there are a number of anthocyanins that are only stable in a liquid form (e.g., elderberry anthocyanins, purple sweet potato anthocyanins, etc.), incorporating a liquid anthocyanin into a dry-blended formulation can result in a colorant composition with unsatisfactory shelf stability. Therefore, some embodiments provide an additive or two-part method of colorant preparation offering the same overall shade and stability in the final product of a dry-blended colorant, but that can be used in conjunction with any of the liquid anthocyanins. The two-part method of colorant preparation may involve preparing a dry-blend colorant formulation that includes all colorant components except the liquid anthocyanin ("Colorant Part I"). Commonly, Colorant Part I can be stored in a sealed container at ambient conditions. At the time of processing of a finished product, Colorant Part I can be combined with a liquid anthocyanin ("Colorant Part II") to yield a colorant of the desired shade and intensity. The resulting colorant can be used in the same manner as other colorants typically used in the manufacturing process.

In other embodiments, a colorant may be formed by combining the buffer, divalent ion source and the anthocyanin. For example, red cabbage powder, TSPP, and calcium carbonate may be combined. The buffer, divalent ion source and the anthocyanin may be dry blended. Dry-blending can be accomplished in a suitable piece of equipment known to those skilled in the art, such as, for example, a Littleford mixer, a ribbon blender, or a V blender. In some embodiments, the dry-blended formulations may contain other colorants. Other colorants can include, without limitation, natural yellow colorants, titanium dioxide, or a mixture thereof. In its dry-blended form, the colorant is commonly stable, and may be added to a base material (e.g., batter mix, dough, gelatin, powder, flake, syrup, ink, etc.) in the same fashion as any other colorant.

Use of Composition Having a Blue Color

Products suitable for coloring with colorant of the present invention include all types of foods, including, but not limited to, pigmented sugar coatings and shellac coatings (alcoholic and aqueous), coatings containing oils and waxes, gum arabic and cellulose types (e.g., hydroxypropyl methyl cellulose). The colorant may be incorporated into or applied onto, without limitation, confectionery, confectionery items, cake decorations, compressed tablets, compressed products, pan-coated products, chewing gums, gum products, dragees, fondant products, marzipan products, filling compositions, cocoa icings and fat icings, chocolate and chocolate-containing products, cocoa gum, tempered chocolates, ice cream, cereals, snack products, coating compositions, glazes, cake glazes, cake bases, produce, scattered sugar decorations, nonpareils, gateaux presentation plates, sugar crystals, dextrose crystals, jelly, gel and gelatin products, sweets, candy, licorice, frostings and icings, candyfloss, fat, sugar and baker's cream compositions, blancmange, puddings, desserts, flan glazing, pretzels, cookies of all types and other based goods such as ice cream cones, crackers, biscuits, enrobed cookies, jelly beans, soft panned items, gumballs, Jordan almonds, various panned confectionery items, chocolate panned nuts, white confectionery coating/yogurt coated products like raisins, caramel pieces, malt balls, smooth hard candies including deposited types (including lozenges), gummy bears or other shapes, molded and enrobed chocolates, cold sweet soups, sodas and carbonated drinks, beverages, alcoholic beverages, non-alcoholic beverages, beverages containing stabilizing additives (such as carboxy methyl cellulose, acidified and non-acidified milk products such as quark, yogurt, cheese, cheese rings, sausage casings, etc.), dairy products, taffy, marshmallows, baked goods, baking mixes, breakfast cereals (including ready-to-eat, instant, and hot), dairy product analogs, nondairy milk, nondairy creamers, nondairy toppings, dressings for salads, food grade inks, decorations, sprinkles, fruit and water ices, frozen confections, gelatin desserts and products, pie fillings, chips, novelty snacks, animal feeds (e.g., bird food, livestock feed, nectar solutions, dog food, cat food, pet treats, wild animal feed), and combinations thereof.

Panning

A typical sugar panning process entails the application of 12-20 coats (average) of color applications to develop the proper finished shade and the traditional texture of a sugar shell. Once the color is applied, the following separate steps may be carried out to finish the panned goods: 1) applying a component to protect the product from humidity, temperature fluctuations, and oxygen (i.e. a sealant/barrier step in which a component is applied); and 2) applying a polishing or shine agent to buff the product to a glossy shine.

Color Stability

Tristimulus values represent the magnitude of three standard stimuli, i.e., hue, chroma (saturation), and lightness, required to match a given light sample. To facilitate accurate specification of object colors and color differences, in 1976, the Commission Internationale de l'clairage ("CIE") recommended three-dimensional uniform color spaces, CIELAB and CIELUV. In imaging applications, CIELAB space is commonly used.

In CIELAB space, L* indicates the lightness (e.g., a more negative L* value indicates that the sample has become darker; a more positive L* value indicates that the sample has become lighter), a* indicates reddishness (a*) to greenishness (−a*), and b* indicates yellowishness (b*) to blueishness (−b*) of a given color. The L*, a*, and b* parameters can be measured with, for example, a tristimulus colorimeter, such as, for example, a COLORQUEST® XE color measurement spectrophotometer (HunterLab, Reston, Va.). The output of the colorimeter can provide a method of quantifying colorant stability, through the calculation of color difference, $\Delta E^*_{ab}$ of a sample at various time intervals. $\Delta E^*_{ab}$ values can be calculated according to the following formula:

$$\Delta E^*_{ab} = \sqrt{(\Delta L^*)^2 + (\Delta a^*)^2 + (\Delta b^*)^2}$$

A small $\Delta E^*_{ab}$ between the color measurements (e.g., less than 7) of a sample may suggest a stable colorant, whereas a large $\Delta E^*_{ab}$ between the color measurements (e.g., greater than 7) of a sample may suggest an unstable colorant. Typically, a $\Delta E^*_{ab}$ of less than about 1 is not detectable to the human eye.

Samples including a colorant can be tested for colorant stability by exposing the sample to a light source, for example, a Xenon lamp that emits a broad spectrum light, i.e., infra-red, ultraviolet, and visible light (about 400 to about 765 W/m$^2$; 0.0036 MJ/W-hr), in a light box and determining $\Delta E^*_{ab}$ for the sample.

The average $\Delta E^*_{ab}$ of a colorant may be between about 0.5 and about 80, about 2 and about 70, and about 5 and about 60 after exposure to about 400 to about 765 W/m$^2$ light for a period of time. The $\Delta E^*_{ab}$ may be less than about 80, less than about 70, less than about 60, less than about 50, less than about 40, less than about 30, and less than about 20.

The $\Delta E^*_{ab}$ may be at least about 0.5, at least about 2, at least about 5, at least about 10, and at least about 15. The period of time may be between about 30 minutes and 6 months, about 1 hour and 5 months, about 2 hours and about 4 months, or about 4 hours and 3 months. The period of time may be less than about six months, less than about five months less than about four months, less than about three months, less than about 14 weeks, or less than about 13 weeks. The period of time may be at least about 30 minutes, at least about one hour, at least about two hours, at least about four hours, at least about eight hours, at least about one day, at least about two days, at least about one week, at least about two weeks, at least about three weeks, at least about one month, at least about six weeks, at least about two months, at least about nine weeks, at least about twelve weeks, at least about three months, at least about four months, or at least about five months.

Samples including a colorant can be tested for colorant stability by exposing the sample to a light source, for example, a Xenon lamp that emits a broad spectrum light, i.e., infra-red, ultraviolet, and visible light (about 400 to about 765 W/m²; 0.0036 MJ/W-hr), in a light box, measuring a first reflectance colorimeter spectral curve of the sample at a first time, further exposing the sample to the light source, measuring a second reflectance colorimeter spectral curve of the sample at a time later than the first time, and determining the integrated space between the first and second reflectance colorimeter spectral curves representing the beginning and ending values for light absorbance in the spectrum region selected (e.g., 430 nm to 530 nm; basic blue spectrum). The spectral reflectance curves can be measured with, for example, a reflectance colorimeter, such as, for example, a COLORQUEST® XE color measurement spectrophotometer (Hunterlab, Reston, Va.). The difference between the two spectral reflectance curve regions can be described as:

$$\int_{430\ nm}^{530\ nm} f(s1)dx - \int_{430\ nm}^{530\ nm} f(s2)dx = \Delta_{reflectance},$$

where s1 is the first reflectance colorimeter spectral curve, s2 is the second reflectance colorimeter spectral curve, and the difference is the area between the reflectance colorimeter spectral curves, s1 and s2, which represents the change in overall reflectance of the sample over time.

In some embodiments, the change in the area beneath the reflectance colorimeter spectral curve may be between about 1% and about 90%, about 5% and about 80%, and about 10% and about 70% after exposure to about 400 to about 765 W/m² light for a period of time. The change in the area beneath the reflectance colorimeter spectral curve may be less than about 90%, less than about 80%, less than about 70%, less than about 60%, less than about 50%, less than about 40%, and less than about 30%. The change in the area beneath the reflectance colorimeter spectral curve may be may be at least about 0.5%, at least about 2%, at least about 5%, at least about 10%, and at least about 15%. The period of time may be between about 30 minutes and 6 months, about 1 hour and 5 months, about 2 hours and about 4 months, or about 4 hours and 3 months. The period of time may be less than about six months, less than about five months less than about four months, less than about three months, less than about 14 weeks, or less than about 13 weeks. The period of time may be at least about 30 minutes, at least about one hour, at least about two hours, at least about four hours, at least about eight hours, at least about one day. at least about two days, at least about one week, at least about two weeks, at least about three weeks, at least about one month, at least about six weeks, at least about two months, at least about nine weeks, at least about twelve weeks, at least about three months, at least about four months, or at least about five months.

EXAMPLES

Materials: Except as indicated, the following materials were used in the Examples below: 03815 Red Cabbage Powder (Sensient Colors Inc., St. Louis, Mo.); extra-fine granulated sugar (United Sugars, Inc., Bloomington, Minn.); titanium dioxide (Huntsmun Corp., Canada, and Innophos Inc., Cranbury, N.J.); polyvinyl pyrrolidone ("PVP"; International Specialty Products, Inc., Wayne, N.J., sold as PLASDONE®)

Example 1

Preparation of Colorant Formulation I

Colorant formulation I was prepared by weighing appropriate amounts of each ingredient listed in Table 1 so that when combined, each ingredient was present in the resulting mixture in the percentage by weight provided in Table 1.

TABLE 1

| Ingredients and % by Weight of Ingredients in Formulation I | |
|---|---|
| Ingredient | % by Weight in Mixture |
| Red cabbage powder | 42.60% |
| Titanium dioxide | 12.00% |
| PVP | 0.14% |
| TSPP | 25.40% |
| Calcium carbonate | 19.86% |

The ingredient mixture was placed in a high-speed blade mixer and was mixed to homogeneity (approximately 10 minutes).

Example 2

Preparation of Colorant Formulation II

Colorant formulation II was prepared by weighing appropriate amounts of each ingredient listed in Table 2 so that when combined, each ingredient was present in the resulting mixture in the percentage by weight provided in Table 2.

TABLE 2

| Ingredients and % by Weight of Ingredients in Formulation II | |
|---|---|
| Ingredient | % by Weight in Mixture |
| Red cabbage powder | 57.2% |
| Titanium dioxide | 8% |
| Sodium carbonate | 2.2% |
| Gum Arabic | 26.3% |
| Calcium carbonate | 6.3% |

The combined ingredients were mixed as described in Example 1 and stored in a closed container.

Example 3

Preparation of Colorant Formulation III

Colorant formulation III was prepared by weighing appropriate amounts of each ingredient listed in Table 3 so that when combined, each ingredient was present in the resulting mixture in the percentage by weight provided in Table 3.

TABLE 3

Ingredients and % by Weight of Ingredients in Formulation III

| Ingredient | % by Weight in Mixture |
|---|---|
| Red cabbage powder | 26.6% |
| Titanium dioxide | 17.4% |
| Turmeric | 13.2% |
| PVP | 0.14% |
| TSPP | 23.1% |
| Calcium carbonate | 19.56% |

The combined ingredients were mixed as described in Example 1 and stored in a closed container.

Example 4

Preparation of Colorant Formulations Using a Two-Step Method

Titanium dioxide (0.9 g), TSPP 719091 (2.1 g) and calcium carbonate (1.5 g) are combined and blended as described in Example 1 to form Colorant Part I. Colorant Part I is stored in a sealed container. Shortly prior to its use in manufacture, (e.g., about 1 hour or less) Colorant Part I will be blended with 702841 Purple Sweet Potato EV 50, Colorant Part II (0.96 g) as described in Example 2.

Example 5

Preparation of a Blue Panned Product

The blue panned product shown in FIG. 1 (Top) was made using colorant prepared as described in Example 2. Panning was carried out as follows:

Materials
  500 grams placebos (Time Cap Labs, Farmingdale, N.Y.)
  Lab scale pan
  Lab scale dryer
  100 mL graduated syringe
  5×8 white postcard (for strip chart)*
  Fresh 67° Bx sucrose syrup**
  *Strip Chart: A strip of tape was affixed (sticky side up) lengthwise onto the 5×8 card—A set of two tablets from each syrup application are attached to this tape.
  **Sucrose syrup: Purified water was brought to a boil. Two parts of sucrose (67 g) were added to 1 part of the hot water (33 g). The mixture was stirred with mild heat until completely dissolved. This syrup may be made and stored for approximately 3 weeks. Do not pan with syrup that is older than 3 weeks due to the presence of invert sugars as invert sugar can drastically affect the panning process.

Panning Method
  500 grams of placebos were placed into the bed of the dry, clean, empty pan. The coating solution was prepared by combining 3 grams (2% dilution) of the blend in Example 2 with 147 grams of 67° Bx (67%) sucrose syrup agitated with high shear until homogenous.

The coating solution was loaded into the graduated syringe to the 50 or 60 cc mark. The pan was turned on (25-30 rpm); while the placebos were tumbling, 2.5 mL of coating solution was added to the center of the placebo bed. The placebos were tumbled until the centers all of the placebos were coated with the coating solution (about 30 seconds). Ambient air was into the pan utilizing the lab-scale dryer. The pan tumbled with drying air until the centers were dry to the touch (about 3-5 minutes). Two placebos were removed and affix them to the top of the strip chart. The drying air was turned off. The coating procedure above, beginning with the addition of the coating solution, was repeated 15 times.

Example 6

Preparation of a Green Panned Product

The green panned product shown in FIG. 1 (Bottom) was made using colorant prepared as described in Example 3. Panning was carried out as described in Example 5.

Example 7

Effect of Divalent Cations on Light Stability of Blue Colorant Compositions

Tests were performed to determine the effectiveness of divalent cations on inhibiting the color degradation of anthocyanins when exposed to long periods of direct, intense light. Calcium carbonate was used as the source of the cation and the coloring components commonly found in vegetables were used as the anthocyanin source. Upon review of the light stability studies, it was determined that the presence of a divalent cation effectively prolonged the color retention of anthocyanins.

Methods and Materials—Panned Placebos

Two sugar based dispersions were made where both contained 3% color components and 97% of sugar syrup. Both dispersions comprised of the same components at the same concentrations, save the presence of calcium carbonate. One dispersion was labeled "A" and contained no calcium carbonate and the other dispersion was labeled "B" and did contain calcium carbonate. The sugar syrup used was a mixture comprised of two parts pure granular sugar cane and one part deionized water. The color components that were common to both dispersions were the anthocyanin found commonly in red cabbage, and titanium dioxide.

Dispersion A did not contain calcium carbonate. The formula used for this dispersion was 97.18% sugar syrup, 1.72% anthocyanin (03815 Red Cabbage Powder, Sensient Colors Inc., St. Louis, Mo.) 0.24% titanium dioxide, 0.07% sodium carbonate and 0.79% acacia gum. The mixture was made by first heating the water to 60° C. and then slowly adding the sugar under high shear mixing. This solution was then allowed to cool down to 20° C. and the rest of the components were added. This mixture was then dispersed under a high shear mixer until the dispersion was fully dispersed. The dispersion was then allowed to cool prior to use in panning placebos.

Dispersion B did contain calcium carbonate. The formula used for this dispersion was 97.00% sugar syrup, 1.72% anthocyanin (03815 Red Cabbage Powder, Sensient Colors Inc., St. Louis, Mo.) 0.24% titanium dioxide, 0.07% sodium carbonate, 0.18% calcium carbonate and 0.79% acacia gum. The mixture was made by first heating the water to 60° C. and then slowly adding the sugar under high shear mixing.

This solution was then allowed to cool down to 20° C. and the rest of the components were added. This mixture was then dispersed under a high shear mixer until the dispersion was fully dispersed. The dispersion was then allowed to cool prior to use in panning placebos.

Figure 2:
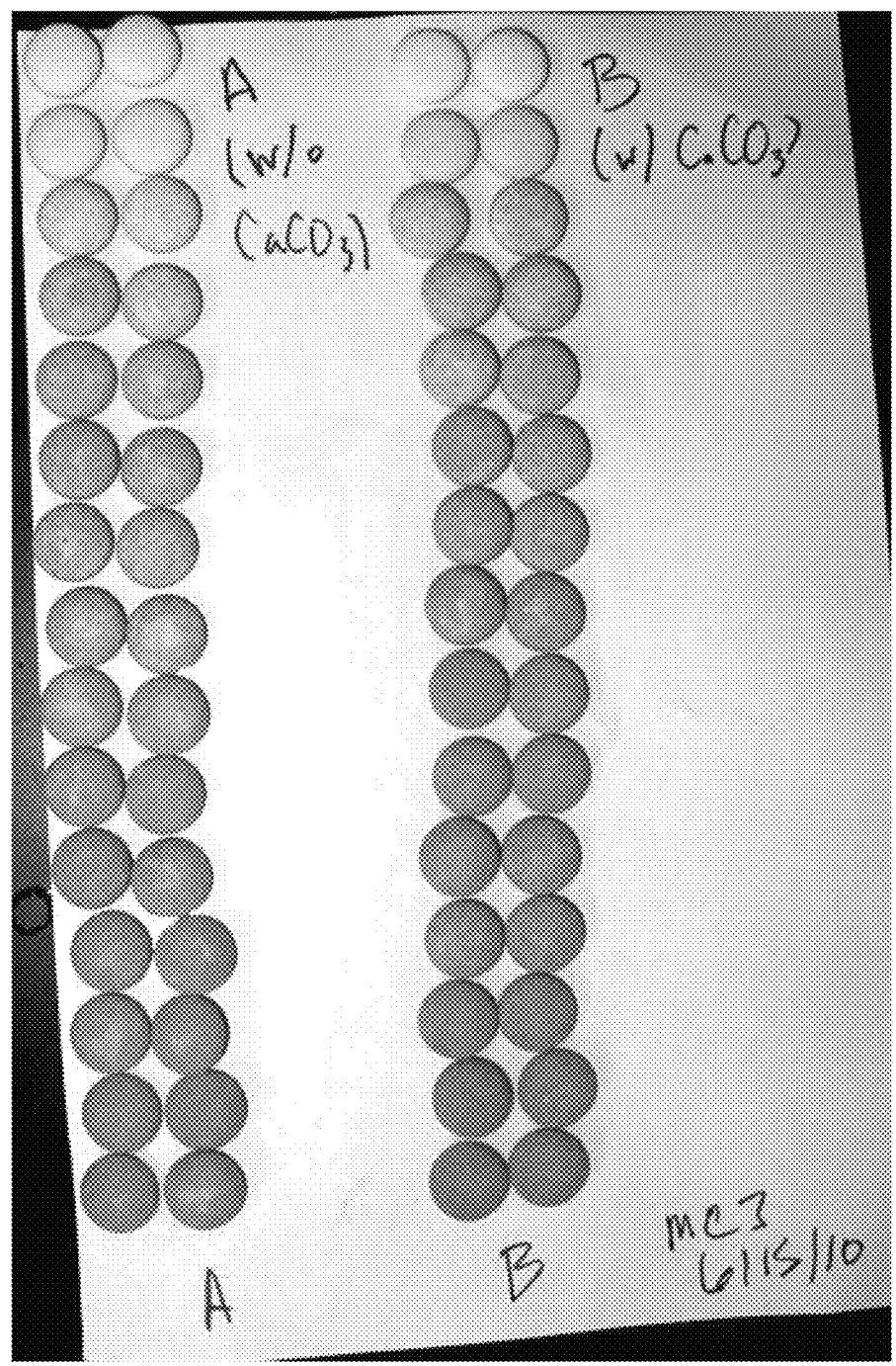
FIG. 2 shows panned placebo tablets removed after each of fifteen applications of colored syrup without calcium carbonate (A) and with calcium carbonate (B).

The panning process involved the slow addition of color to small, individual confectionery pieces. Placebo tablets (Time Cap Labs, Farmingdale, N.Y.) were used. Placebo tablets are uniform white tablets which are compressed calcium sulfate tablets, each weighing about 0.25-0.75 g. A total of 500 g of placebos were used for each panning trial. During the panning process, small aliquots of the dispersion were applied into the pan atop the placebos. During the panning process, the lab pan rotated (at about 20-25 rpm), which caused the placebos to move inside the pan. The friction that occurred from the rubbing of the tumbling placebos distributed the colored syrup and dried the placebos. For each panning process, 15 applications of the colored syrup were used at 2.5 mL increments. A total of 37.5 mL (50 grams) of the respective dispersion were added to each trial. A strip chart was used during the panning process in which placebos were removed after each injection to monitor the effectiveness of the coating procedure (see FIG. 2).

Once the two dispersions were panned onto placebos, the placebos were measured by a (Hunter Lab ColorQuest XE—Dual Beam Xenon Flash Spectrophotometer) colorimeter for L,a,b testing values. The initial readings from the colorimeter along with pictures taken were recorded as time zero standards. The placebos were each placed into transparent labeled jars and placed into a light box for stability testing. A Binder APT.lineTM KBF-ICH Climate Chamber with ICH Compliant Illumination light box was used which keeps a constant temperature of 25° C., a constant humidity of 60% rH and a constant spectral range of 800-320 nm from ten fluorescent bulbs. The placebos were routinely pulled out of the light box for measurement on the colorimeter and to have pictures taken.

Results and Discussion

Figure 3:
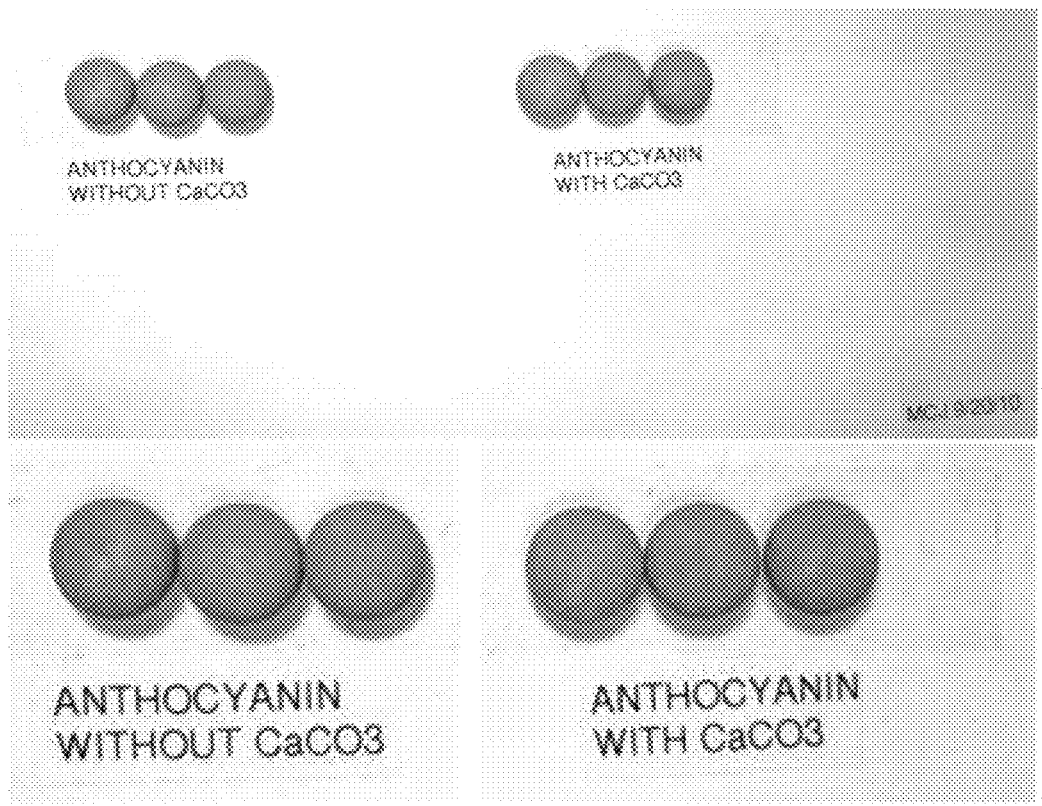
FIG. 3 shows panned placebo tablets after 95 days in a light box.

As shown in FIG. 3, after the two sets of panned placebos were placed in the light box for 95 days, a visual shade difference appeared prominent. FIG. 3 demonstrates the difference between the purple shade of the placebo panned with dispersion A and dispersion B; the placebo panned with dispersion B was still blue. This qualitative data provides evidence that the presence of a divalent ion prolongs shade color retention and inhibits visual degradation in hue.

Figure 4:
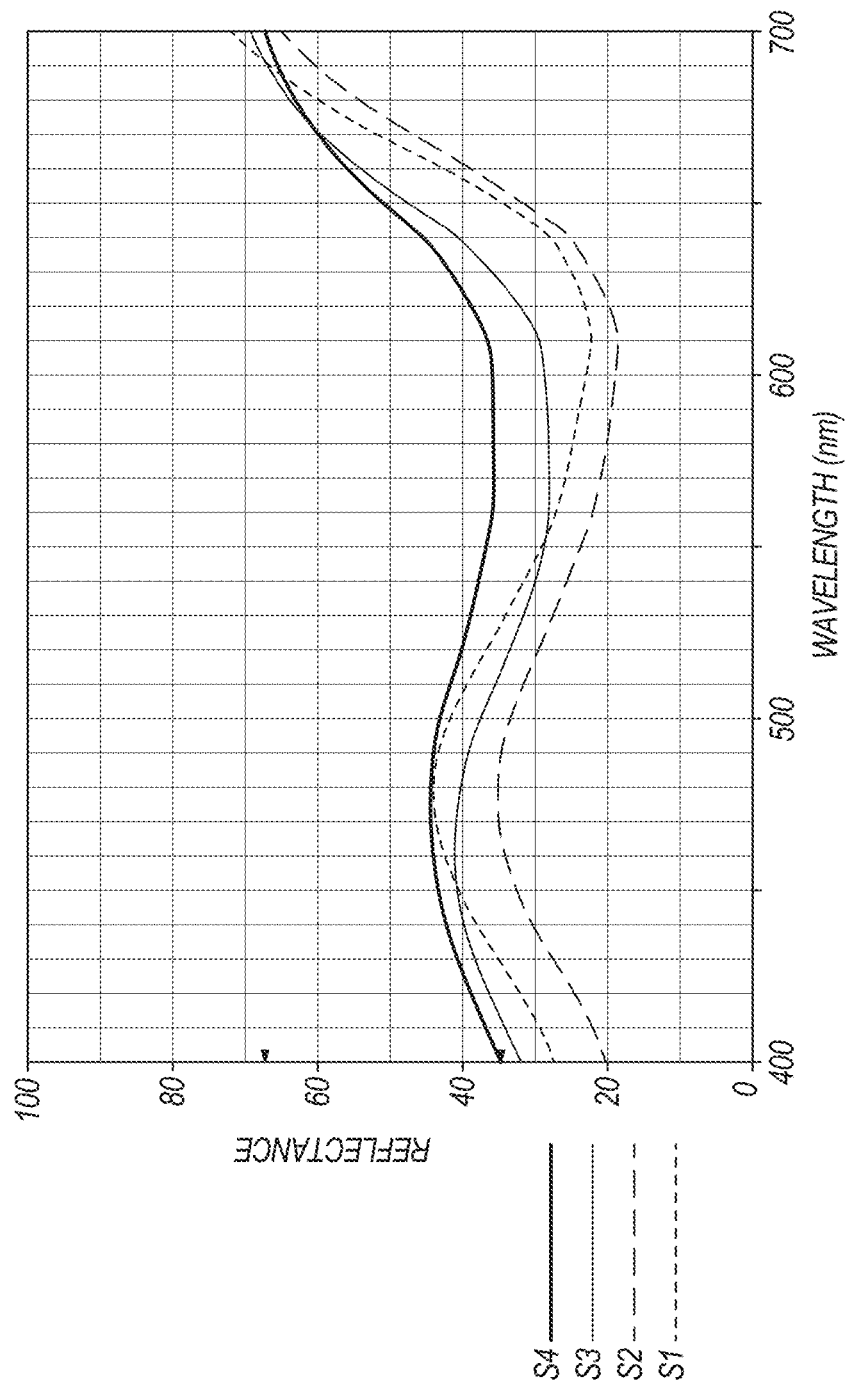
FIG. 4 shows a comparison of spectral values before and after exposure to intense light for colorant compositions without calcium carbonate (S1—exposure time=1 day; S2—exposure time=3 months) and colorant compositions including calcium carbonate (S3—exposure time=1 day; S4—exposure time=3 months).
Figure 5:
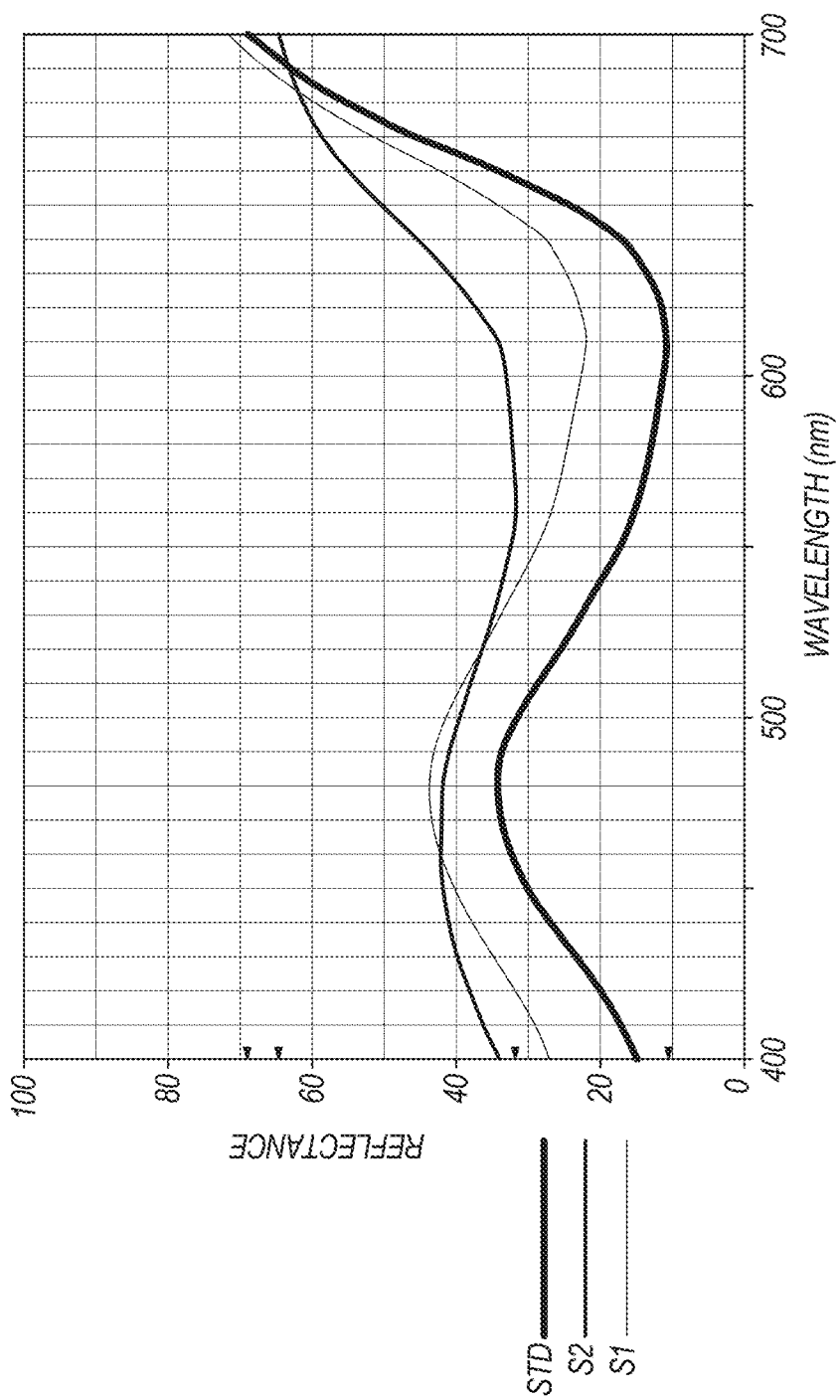
FIG. 5 shows spectral values for colorant compositions without calcium carbonate at STD (exposure time=0), S1 (exposure time=1 day), and S2 (exposure time=3 months).
Figure 6:
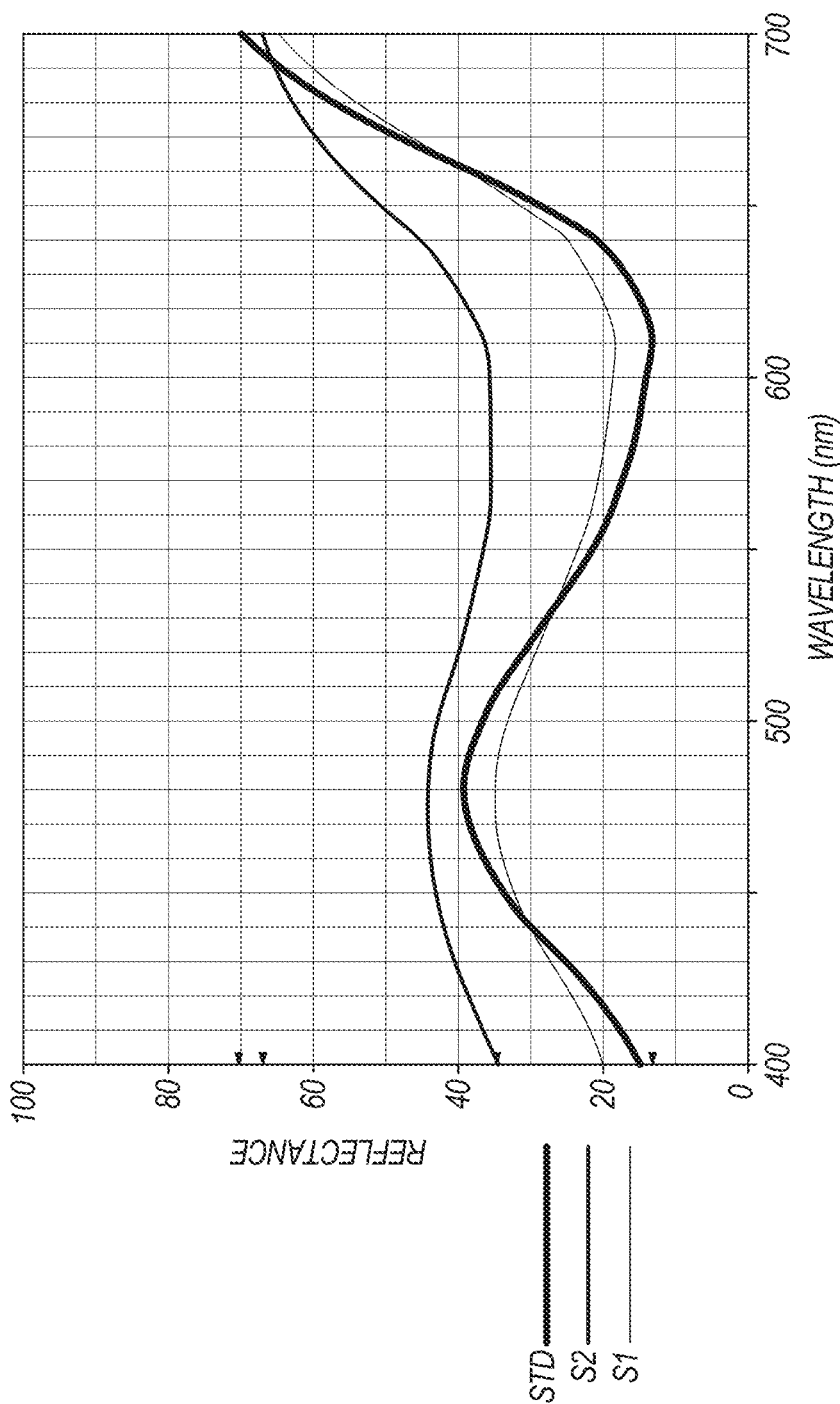
FIG. 6 shows spectral values for colorant compositions including calcium carbonate at STD (exposure time=0), S1 (exposure time=1 day), and S2 (exposure time=3 months).
Figure 7:
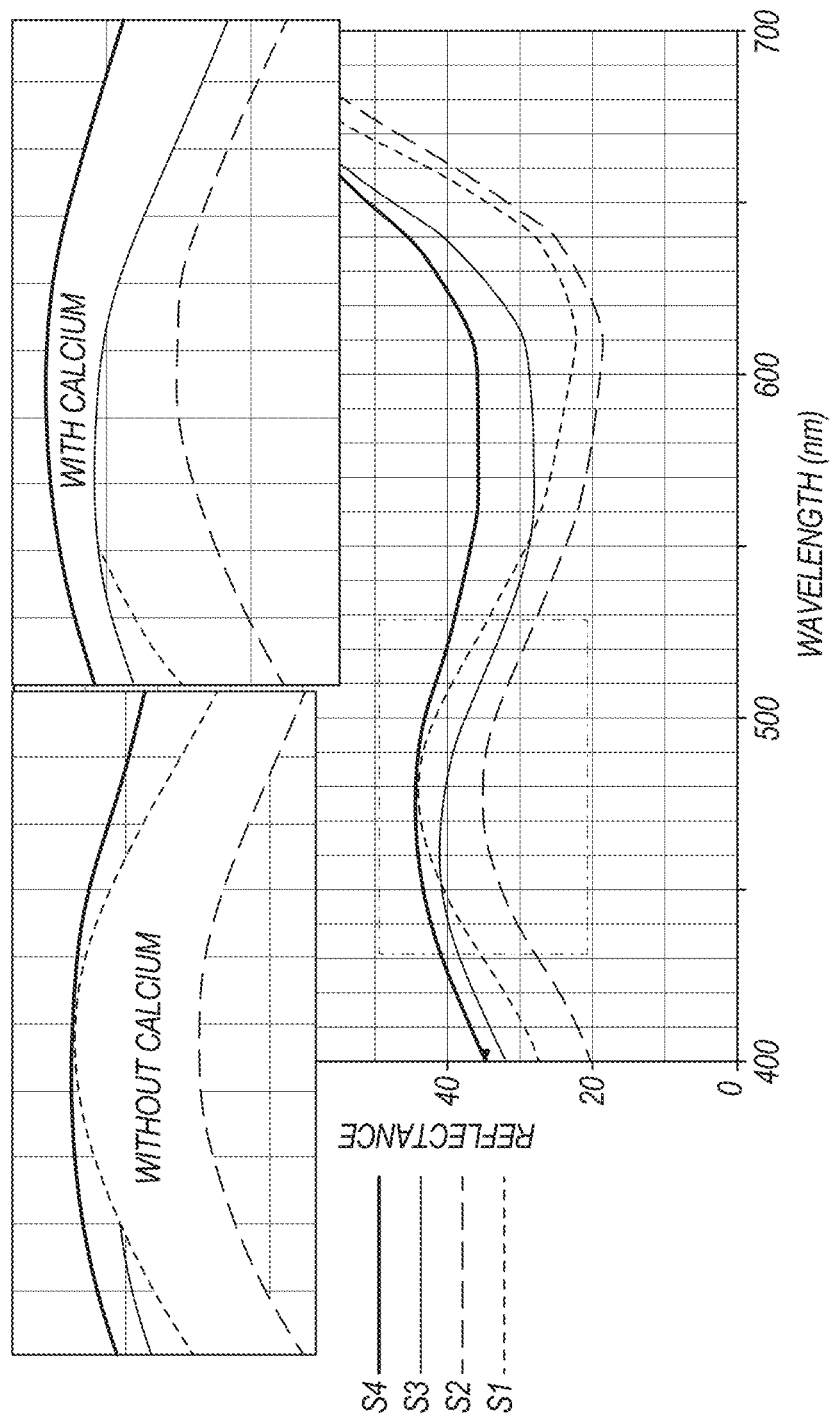
FIG. 7 shows the area between spectral curves for colorant compositions with and without calcium after exposure to intense light for about 3 months.

Referring to FIG. 4, a total of thirteen spectral measurements over a period of thirteen weeks were performed on both sets of placebos using the colorimeter listed above. Comparing the first and last measurements of both sets of placebos, one can see that the presence of a divalent ion provides more shade range stability than without. The spectral charts of the placebos without calcium carbonate have a much broader range. The next two graphs presented help to paint a picture of larger and larger variance in the placebos coated with colorant composition having calcium no added (see FIG. 5), than those coated with colorant composition including calcium (see FIG. 6). This is quantified in the graph shown in FIG. 7, where the shaded areas shown represent the integrated space between the two respective curves representing the beginning and ending values for light absorbance in the spectrum selected (430 to 530 nm; basic blue spectrum). The total difference between the two regions can be described as:

$$\int_{430\,nm}^{530\,nm} f(s1)dx - \int_{430\,nm}^{530\,nm} f(s2)dx = \Delta_{reflectance}^{without\ calcium},$$

$$\int_{430\,nm}^{530\,nm} f(s1)dx - \int_{430\,nm}^{530\,nm} f(s2)dx = \Delta_{reflectance}^{with\ calcium},$$

$$\frac{\Delta_{reflectance}^{without\ calcium}}{\Delta_{reflectance}^{with\ calcium}} = 1.84,$$

and is roughly equal to 1.84. This means that the area between the curves, representing the absorbance of blue light by the placebos made without calcium, is about 184% of those made with calcium. Therefore, there is a greater variance in blue color shade over time for the placebos panned without the addition of calcium carbonate.

Three specific measurements (see FIGS. 5 and 6), namely, those determined on control (STD), first trial reading (S1) and the last trial reading (S2) demonstrate a difference in blue shade stability. As time progressed, a wider margin in spectral difference (with regard to the blue area) occurs with the placebos panned with blend A lacking calcium. In all three cases, the placebos panned with the dispersion containing calcium carbonate were bluer than the other set of placebos.

The ΔE value for all measurements is shown in Tables 4 and 5, and demonstrates a greater variation among those placebos that were panned with the dispersions not containing calcium carbonate.

TABLE 4

Colorimetry Measurement of Panned Placebos without CaCO₃

| Trial | Elapsed Time (Hours) | ZZL* | a* | b* | ΔE |
|---|---|---|---|---|---|
| Standard | 0 | 51.72 | −11.9 | −15.67 | 0 |
| 1 | 15 | 52.9 | −8.93 | −15.7 | 3.2 |
| 2 | 24 | 56.21 | −10.03 | −15.04 | 4.9 |
| 3 | 39 | 58.29 | −1.85 | −11.7 | 12.64 |
| 4 | 48 | 59.86 | −2.41 | −12.1 | 13 |
| 5 | 64 | 55.3 | −3.8 | −13.81 | 9.04 |
| 6 | 72 | 56.02 | −4.33 | −13.17 | 9.05 |
| 7 | 135 | 57.57 | −2.48 | −13.52 | 11.3 |
| 8 | 169 | 58.28 | −2.45 | −12.51 | 11.93 |
| 9 | 193 | 57.95 | −3.1 | −13.44 | 11.01 |
| 10 | 528 | 58.83 | 2.21 | −12.88 | 22.7 |
| 11 | 1052 | 65.35 | 4.06 | −7.02 | 16.04 |
| 12 | 1584 | 59.25 | 2.26 | −11.36 | 16.61 |
| 13 | 2204 | 63.27 | 2.87 | −9.97 | 19.59 |

TABLE 5

Colorimetry Measurement of Panned Placebos with CaCO₃

| Trial | Elapsed Time (Hours) | L* | a* | b* | ΔE |
|---|---|---|---|---|---|
| Standard | 0 | 56.25 | −13.65 | −13.09 | 0 |
| 1 | 15 | 57.28 | −6.57 | −9.6 | 7.96 |
| 2 | 24 | 57.62 | −11.6 | −10.89 | 3.31 |
| 3 | 39 | 57.92 | −6.82 | −10.76 | 7.4 |
| 4 | 48 | 55.34 | −13.77 | −11.31 | 2 |
| 5 | 64 | 56.97 | −9.73 | −10.22 | 4.91 |
| 6 | 72 | 60.58 | −4.1 | −7.64 | 11.82 |
| 7 | 135 | 59.96 | −7.45 | −8.41 | 8.61 |
| 8 | 169 | 57.41 | −8.53 | −10.48 | 5.86 |
| 9 | 193 | 59.05 | −7.01 | −10.98 | 7.5 |
| 10 | 528 | 64.08 | −0.72 | −7.09 | 16.26 |
| 11 | 1052 | 59.58 | −3.29 | −11.02 | 11.07 |
| 12 | 1584 | 61.51 | −2.39 | −10.37 | 12.72 |
| 13 | 2204 | 68.46 | 0.58 | −4.74 | 20.53 |

Example 8

Effect of Divalent Cations on Light Stability of Blue Colorant Compositions

Methods and Materials—Solutions

Two aqueous solutions were prepared, both containing the same color component: anthocyanins commonly found in sweet potatoes. Solution "A" was made with a blend that contained no calcium carbonate. Solution "B" was made with a blend that did contain calcium carbonate. The blend used to make solution A was prepared with 409528 Blue Antho P-WS (Sensient Food Colors Germany GmbH, Geesthacht, Germany). The blend used to make solution B comprised the following components: 35.85% anthocyanin commonly found in sweet potatoes, 53.76% tricalcium phosphate, 3.58% calcium carbonate, and 6.81% sodium carbonate. These two solutions were diluted so that a visual light spectrum could be measured on an UV/Vis spectrophotometer.

Prior to the measuring of the shade stability of both solutions, a standardization of the relative color strength for both solutions was performed. For each blend, 400 mg of the blend was added to a 1L volumetric flask and was filled with a buffer set at a pH of 3. A sample of the solutions was then measured on a Beckman-Coulter DU640 UV/Vis Spectrophotometer to determine the relative absorbance of its peak with a wavelength nearest to 520 nm. The absorbance of the peak was used to determine the equivalent 1% ratio for this solution:

$$E_a = 25 \times A_{520\,nm}$$

where Ea is the equivalent 1% ratio for solution A, $A_{520\,nm}$ is the absorbance peak nearest to 520 nm for this dilution, and 25 is the correction factor needed to transform the 1:2500 dilution used here to the 1:100 (or 1%) dilution indicated.

Once both $E_a$ and $E_b$ were found, the two solutions' relative strengths were standardized using the following equation:

$$\frac{E_a}{E_b} = x$$

where x is the correlation factor between the two equivalent ratios and the correction factor to standardize both ratios.

Two new solutions were prepared, one of each of the blends (A, B) and were diluted to the relative concentrations such that their equivalent 1% ratio would be equal to each other. A UV/Vis spectrum was measured for both solutions immediately along with a photograph of the two solutions side by side, and was recorded as time zero. Four hours later, another set of spectra and pictures were recorded, then 24 hours later, and thereafter at regular time intervals. Specific measurements recorded for each spectrum were the time, absorption peak and the peak wavelength.

Solutions—Results

Figure 8:
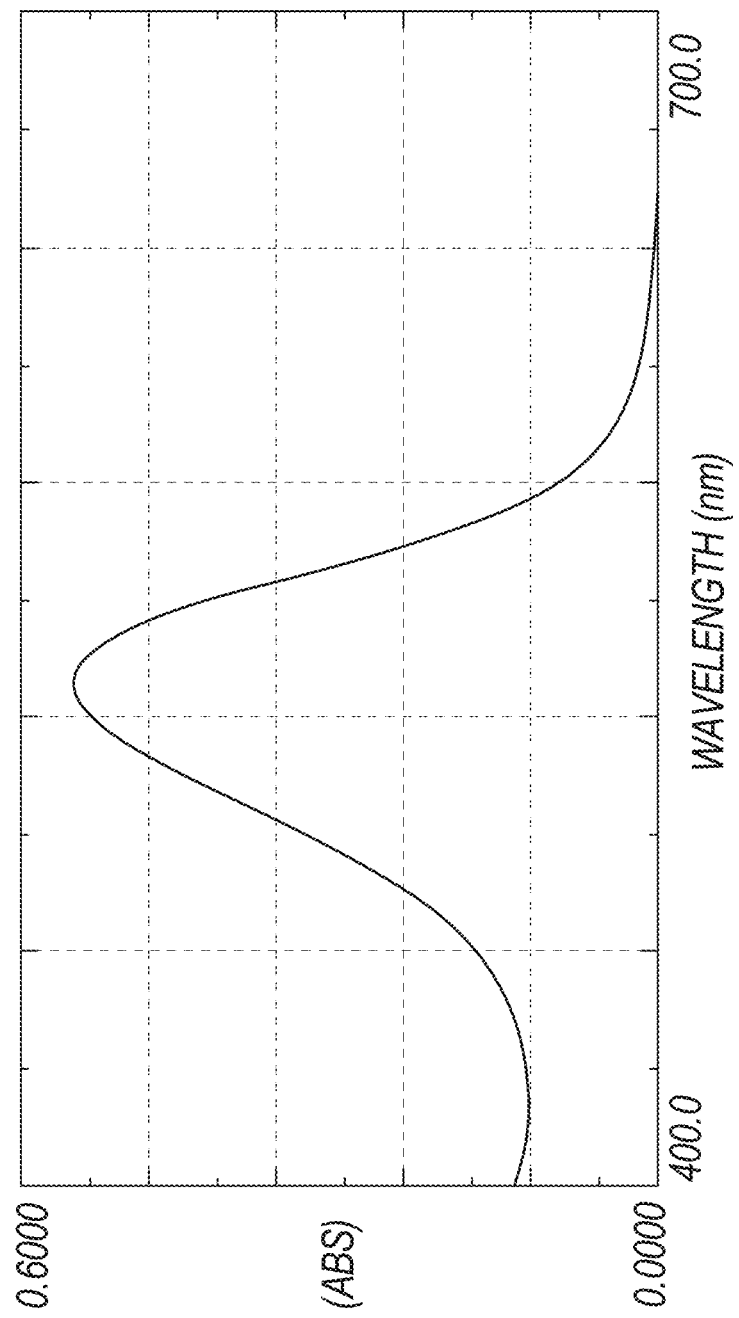
FIG. 8 shows a spectral scan of a colorant composition without calcium carbonate in a pH 3 buffer solution comparing shift in wavelength v. absorbance for each graph.
Figure 9:
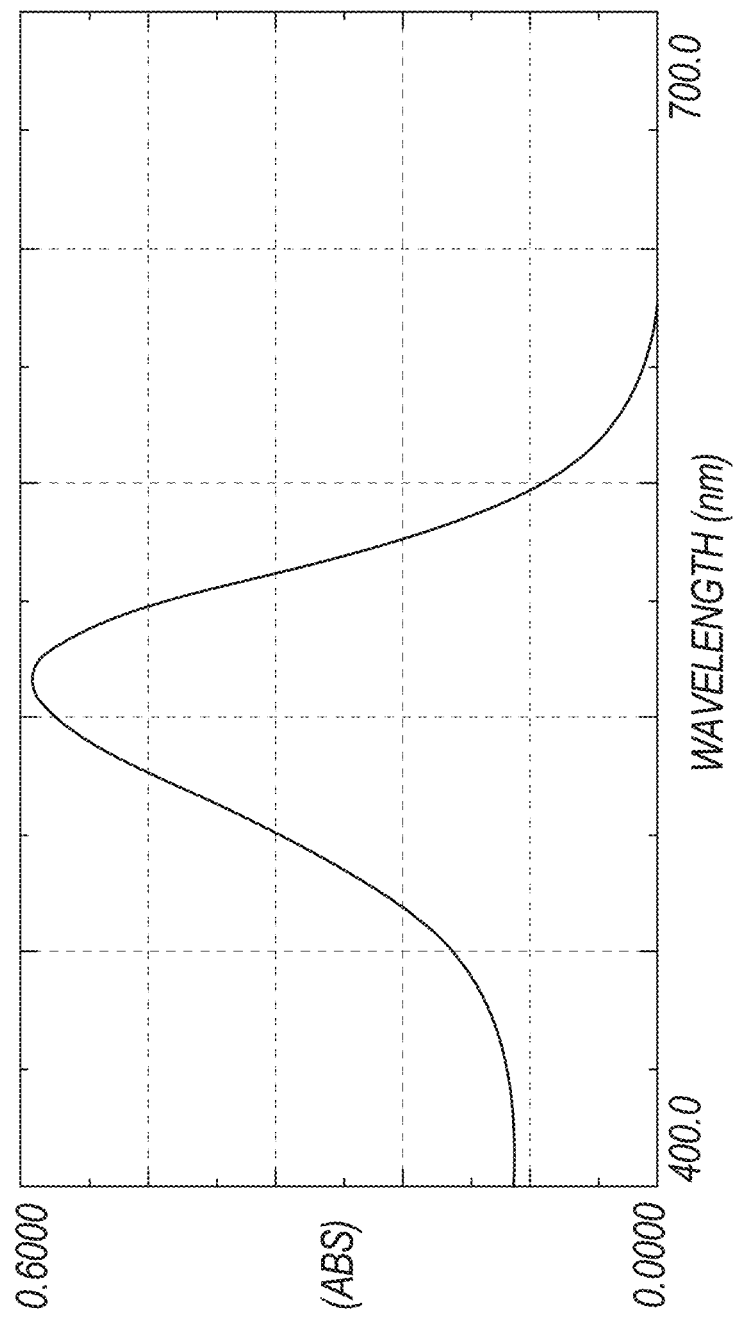
FIG. 9 shows a spectral scan of a colorant composition including calcium carbonate in a pH 3 buffer solution comparing shift in wavelength v. absorbance for each graph.

The two solutions were prepared as described above at 0.04% in pH 3 buffer solution. Solution A had a peak at 529.0 nm with an absorbance value of 0.5508 (see FIG. 8) and solution B had a peak at 530.0 nm and an absorbance value of 0.5853 (see FIG. 9). The determined $E_a$ was found to be 13.77 and $E_b$ to be 14.6325. The correlation factor, x, was found to be 0.9411. Two solutions were made to be equal in equivalent 1% ratios. Solution A was made with blend A at a concentration of 0.0107% (labeled as 0.011%). Solution B was made with blend B to match the 0.0106% concentration of solution A. This concentration was set at 0.01%. The rest of the procedure described above was followed as written.

Figure 10:
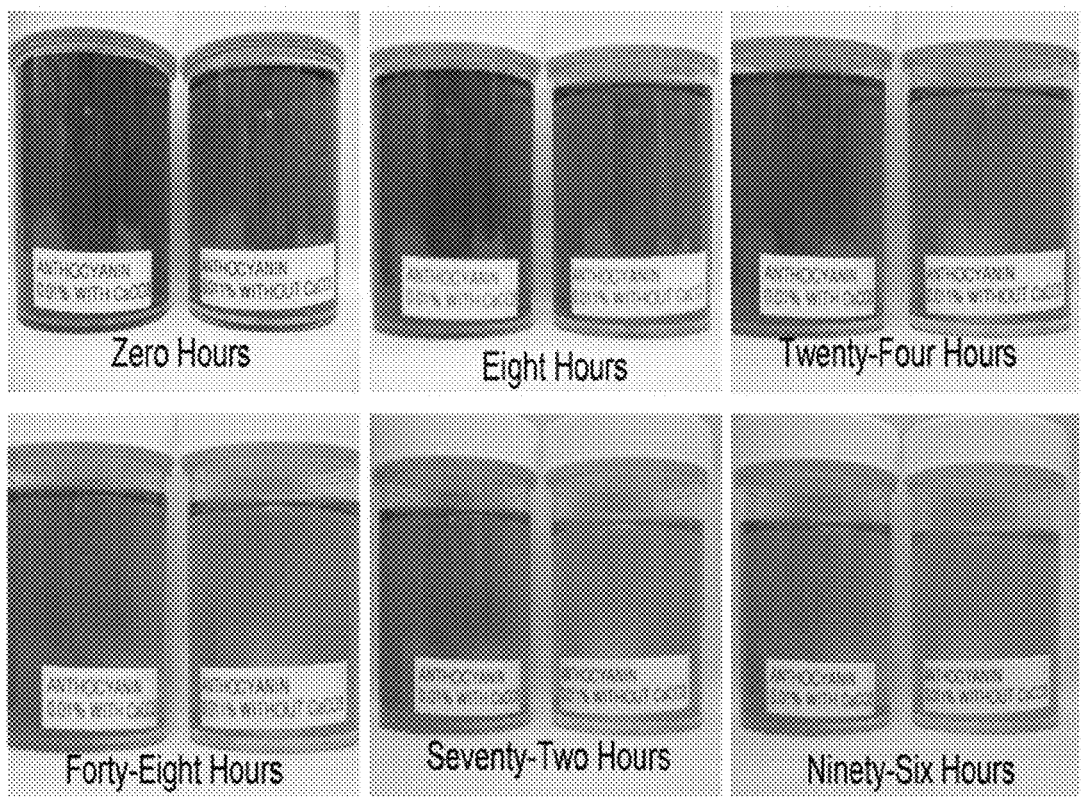
FIG. 10 shows anthocyanin solutions with and without calcium carbonate at different times; at each time, the solution on the left includes calcium carbonate, the solution on the right does not include calcium carbonate.

Pictures were taken of the color change over time (see FIG. 10). Referring to FIG. 10, over time, the solution with calcium carbonate retained a blue hue longer and then retained a purple hue when the other solution became red in hue. This gives a qualitative assessment of the shade integrity that calcium carbonate provides to solution B.

Table 6 shows the change of absorbance over time and standard deviation of the change in peak wavelength was created from the UV/Vis spectrophotometer readings, where $A(A_{\lambda max})$ is the absorbance of the highest peak, $\Delta A/t$ (µHz) is the change in absorbance over time in microhertz, and $\sigma_{(peak)}$ is the standard deviation of peak wavelength.

TABLE 6

Changes in Anthocyanin Colorant Composition Measurements over Time

| Name | Elapsed Time | A (λmax) | ΔA/t (µHz) | Peak (nm) | σ (Peak) |
|---|---|---|---|---|---|
| Anthocyanin Without Ca2+ | 0.00 | 0.1724 | 0 | 603 | 26.84337286 |
| Anthocyanin Without Ca2+ | 8.00 | 0.1349 | 1.302083333 | 603 | |
| Anthocyanin Without Ca2+ | 24.00 | 0.0715 | 0.733796296 | 600 | |
| Anthocyanin Without Ca2+ | 48.00 | 0.0465 | 0.144675926 | 586 | |
| Anthocyanin Without Ca2+ | 72.00 | 0.0355 | 0.042438272 | 546 | |
| Anthocyanin Without Ca2+ | 96.00 | 0.0506 | 0.04369213 | 549 | |
| Anthocyanin With Ca2+ | 0.00 | 0.2573 | 0 | 604 | 23.40441554 |
| Anthocyanin With Ca2+ | 8.00 | 0.1939 | 2.201388889 | 604 | |
| Anthocyanin With Ca2+ | 24.00 | 0.1156 | 0.90625 | 605 | |
| Anthocyanin With Ca2+ | 48.00 | 0.092 | 0.136574074 | 604 | |
| Anthocyanin With Ca2+ | 72.00 | 0.0684 | 0.091049383 | 561 | |
| Anthocyanin With Ca2+ | 96.00 | 0.0507 | 0.051215278 | 557 | |

Table 6 shows that the absorbance values of solution B degrade at a slower rate than solution A, initially at a factor of one half the rate. The table also shows that the peak wavelength integrity holds more strongly with solution containing calcium carbonate, than not.

When comparing the two solutions, the standard deviation in wavelength peak is greater for the solutions without calcium carbonate; these data support the visual data discussed above.

The test results presented in Examples 7 and 8 demonstrate the effectiveness of a divalent cation in inhibiting color degradation in anthocyanins. Visual, spectral, and change in ΔE values over time. Furthermore, the results from the solution trials provide similar evidence. Visually, the anthocyanin solution with calcium carbonate retained its blue shade longer. Analytically, the calcium provided slower absorbance degradation and a smaller shift in wavelength peak over time.

Accordingly, calcium carbonate does prolong shade retention. This is most. noticeably found when viewing the two sets of placebos side by side. However, it is also supported by viewing the visual absorbance of the blue region of the light spectrum over time.

Prophetic Examples

For each of the following Examples 9-15, the listed ingredients will be mixed to form a natural blue colorant composition.

Example 9

Natural Blue Blend

| Component | Wt % |
| --- | --- |
| Anthocyanin - Grape Powder | 65.00 |
| Titanium Dioxide | 34.50 |
| Sodium Carbonate | 00.25 |
| Calcium Carbonate | 00.25 |

Example 10

Natural Blue Blend

| Component | Wt % |
| --- | --- |
| Anthocyanin - Red Cabbage | 71.00 |
| Tetrasodium Pyrophosphate | 09.00 |
| Titanium Dioxide | 18.00 |
| Calcium Carbonate | 02.00 |

Example 11

Natural Blue Ink

| Component | Wt % |
| --- | --- |
| HPMC | 06.00 |
| Water | 50.00 |
| Isopropyl Alcohol | 38.00 |
| Red Sweet Potato (anthocyanin) | 04.50 |
| Magnesium Chloride | 00.25 |
| Calcium Chloride | 00.25 |
| Di-Potassium Phosphate | 01.00 |

Example 12

Natural Blue Oil-Based Dispersion

| Component | Wt % |
| --- | --- |
| Elderberry Anthocyanin | 06.25 |
| Sodium Carbonate | 00.25 |
| Calcium Carbonate | 00.25 |
| Lecithin | 10.00 |
| Vegetable Oil | 40.00 |
| Propylene Glycol | 43.25 |

Example 13

Natural Blue Glycerine-Based Dispersion

| Component | Wt % |
| --- | --- |
| Glycerine | 70.00 |
| Purple Sweet Potato (anthocyanin) | 25.00 |
| Sodium Tripolyphosphate | 04.00 |
| Calcium Carbonate | 01.00 |

Example 14

Natural Blue Sugar-Based Dispersion

| Component | Wt % |
| --- | --- |
| Water | 22.70 |
| Sugar | 44.43 |
| Red Cabbage Anthocyanin | 15.00 |
| Titanium Dioxide | 05.25 |
| Sodium Carbonate | 01.00 |
| Calcium Carbonate | 01.50 |
| Methyl Paraben | 00.10 |
| Propyl Paraben | 00.02 |
| Sorbitol Solution | 10.00 |

Example 15

Natural Blue Propylene Glycol Dispersion

| Component | Wt % |
| --- | --- |
| Propylene Glycol | 65.00 |
| Anthocyanin - Grape Powder | 25.00 |
| Monobasic Calcium Phosphate | 07.00 |
| Sodium Carbonate | 03.00 |

Example 16

Natural Blue Colorant in a Food Intended for Human Consumption

| Component | Wt % |
| --- | --- |
| Compound coating | 97 |
| Natural Blue Oil-Based Dispersion (Example 12) | 3 |

Natural Blue Oil-Based Dispersion (Example 12) will be combined with compound coating (available from Guittard, Chocolate, Burlingame, Calif.) to form a colored compound coating suitable for use in, without limitation, confectionery.

Example 17

Natural Blue Colorant in a Food Intended for Animal Consumption

| Component | Wt % |
|---|---|
| Cereal grain | 99-96 |
| Natural Blue Ink (Example 11) | 1-4 |

Natural Blue Ink (Example 11) will be combined with a cereal grain such as, without limitation, corn, rice, wheat, barley, sorghum, millet, oats, rye, triticale, fonio, teff, buckwheat, and combinations thereof.

What is claimed is:

1. A method of stabilizing a blue colorant, the method comprising:
    combining an anthocyanin, a divalent ion source, and a buffer selected from the group consisting of tetrasodium pyrophosphate, sodium carbonate, dipotassium phosphate, sodium tripolyphosphate, and a combination thereof to provide a blue composition,
    wherein the blue composition comprises 10% buffer to about 50% buffer by weight of the blue composition; and
    wherein the blue composition comprises 1% to 25% divalent ion source by weight of the blue composition.

2. The method of claim 1, wherein the method comprises first combining the buffer and the divalent ion source to form a mixture followed by combining the mixture with the anthocyanin.

3. The method of claim 1, wherein the anthocyanin is a compound of the formula:

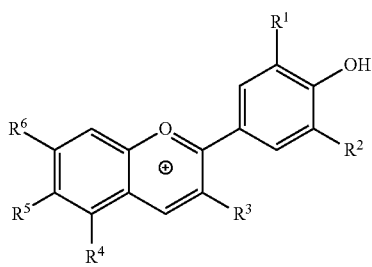

wherein $R^1$, $R^2$, and $R^5$ are each independently H, OH, or $OCH_3$, and $R^3$, $R^4$, and $R^6$ are each independently H, OH, $OCH_3$, a sugar residue, or an acylated sugar residue.

4. The method of claim 1, wherein the anthocyanin is a natural anthocyanin.

5. The method of claim 1, wherein the average variation of $\Delta E^*_{ab}$ of the composition is about 30% less than the average variation of $\Delta E^*_{ab}$ of a control composition after exposure of the composition and the control composition to a 400 to 765 W/m² light source for about 13 weeks, wherein the control composition comprises the same components as the composition but comprises no divalent ion source.

6. The method of claim 1, wherein the composition exhibits a less than about 20% change in the area beneath the reflectance colorimeter spectral curve of the composition from 430 nm to 530 nm measured over a period of time of at least about 13 weeks.

7. The method of claim 6, wherein the period of time is at least about 3 months.

8. The method of claim 1, further comprising adding a natural yellow colorant.

9. The method of claim 1, wherein the divalent ion source comprises calcium carbonate, calcium chloride, magnesium carbonate, magnesium chloride, or a combination thereof.

10. A method of modifying a food product, the method comprising:
    adding to the food product a composition comprising an anthocyanin, a divalent ion source, and a buffer selected from the group consisting of tetrasodium pyrophosphate, sodium carbonate, dipotassium phosphate, sodium tripolyphosphate, and a combination thereof,
    wherein the blue composition comprises 10% buffer to about 50% buffer by weight of the blue composition; and
    wherein the blue composition comprises 1% to 25% divalent ion source by weight of the blue composition.

11. The method of claim 10, wherein the food product is intended for human consumption.

12. The method of claim 10, wherein the food product is intended for animal consumption.

13. The method of claim 10, wherein the composition further comprises a natural yellow colorant.

14. The method of claim 10, wherein the divalent ion source comprises calcium carbonate, calcium chloride, magnesium carbonate, magnesium chloride, or a combination thereof.

15. A composition having a blue color, the composition comprising:
    a buffer selected from the group consisting of tetrasodium pyrophosphate, sodium carbonate, dipotassium phosphate, sodium tripolyphosphate, and a combination thereof;
    an anthocyanin; and
    a divalent ion source,
    wherein the composition comprises 10% buffer to about 50% buffer by weight of the composition; and
    wherein the composition comprises 1% to 25% divalent ion source by weight of the composition.

16. The composition of claim 15, wherein the anthocyanin comprises red cabbage anthocyanin, purple sweet potato anthocyanin, red sweet potato anthocyanin, or a combination thereof.

17. The composition of claim 15, wherein the anthocyanin is a compound of the formula:

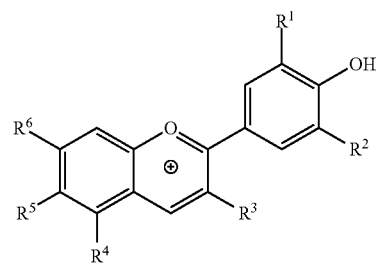

wherein $R^1$, $R^2$, and $R^5$ are each independently H, OH, or $OCH_3$, and $R^3$, $R^4$, and $R^6$ are each independently H, OH, $OCH_3$, a sugar residue, or an acylated sugar residue.

18. The composition of claim 15, wherein the divalent ion source comprises calcium carbonate, calcium chloride, magnesium carbonate, magnesium chloride, or a combination thereof.

19. The composition of claim 15, wherein the composition has a pH of about 5 to about 10.

20. The composition of claim 15, wherein the composition further comprises a natural yellow colorant.

* * * * *

UNITED STATES PATENT AND TRADEMARK OFFICE
CERTIFICATE OF CORRECTION

PATENT NO. : 10,499,669 B2  
APPLICATION NO. : 15/377713  
DATED : December 10, 2019  
INVENTOR(S) : Gale D. Myers et al.

Page 1 of 1

It is certified that error appears in the above-identified patent and that said Letters Patent is hereby corrected as shown below:

In the Specification

Column 1, Line 10: replace the date "Nov. 25, 2019" with the date --Nov. 25, 2009--

Signed and Sealed this  
Second Day of June, 2020

Andrei Iancu  
*Director of the United States Patent and Trademark Office*